United States Patent
Beltman et al.

(10) Patent No.: US 9,170,616 B2
(45) Date of Patent: Oct. 27, 2015

(54) QUIET SYSTEM COOLING USING COUPLED OPTIMIZATION BETWEEN INTEGRATED MICRO POROUS ABSORBERS AND ROTORS

(75) Inventors: Willem Beltman, West Linn, OR (US); Jessica Gullbrand, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 844 days.

(21) Appl. No.: 12/650,997

(22) Filed: Dec. 31, 2009

(65) Prior Publication Data
US 2011/0159797 A1 Jun. 30, 2011

(51) Int. Cl.
F24F 7/007 (2006.01)
F28F 13/12 (2006.01)
G06F 1/20 (2006.01)
F04D 29/66 (2006.01)

(52) U.S. Cl.
CPC .............. G06F 1/20 (2013.01); F04D 29/665 (2013.01)

(58) Field of Classification Search
USPC .......... 454/338; 165/121; 381/354; 367/901; 252/62; 106/601; 181/212, 175, 256, 181/284
See application file for complete search history.

(56) References Cited

U.S. PATENT DOCUMENTS

| | | | | |
|---|---|---|---|---|
| 2,361,748 A | * | 10/1944 | Daiger et al. | 310/216.067 |
| 2,561,592 A | * | 7/1951 | Charles | 261/24 |
| 3,504,736 A | * | 4/1970 | Tausch | 165/287 |
| 3,583,174 A | * | 6/1971 | Logue | 62/309 |
| 3,599,442 A | * | 8/1971 | Hanson | 62/239 |
| 4,237,080 A | * | 12/1980 | Elliott | 261/80 |
| 4,315,343 A | * | 2/1982 | Neroda et al. | 15/339 |
| 4,372,196 A | * | 2/1983 | Henderson | 454/349 |
| 4,560,320 A | * | 12/1985 | Baus | 415/118 |
| 4,560,395 A | * | 12/1985 | Davis | 96/381 |
| 5,199,846 A | * | 4/1993 | Fukasaku et al. | 415/119 |
| 5,299,634 A | * | 4/1994 | Toyoda et al. | 165/135 |
| 5,336,046 A | * | 8/1994 | Hashimoto et al. | 415/119 |
| 5,919,029 A | * | 7/1999 | Van Nostrand et al. | 415/119 |
| 6,419,576 B1 | * | 7/2002 | Han | 454/338 |
| 6,483,924 B1 | * | 11/2002 | Kirjavainen | 381/191 |
| 6,688,424 B1 | * | 2/2004 | Nakada et al. | 181/224 |
| 6,711,267 B1 | * | 3/2004 | Kirjavainen | 381/71.1 |
| 6,865,079 B2 | * | 3/2005 | Yu | 361/697 |
| 6,927,979 B2 | * | 8/2005 | Watanabe et al. | 361/697 |

(Continued)

FOREIGN PATENT DOCUMENTS

| | | |
|---|---|---|
| CN | 1336482 A | 2/2002 |
| DE | 10-2004-051521 B3 | 7/2006 |

(Continued)

OTHER PUBLICATIONS

Office Action received for United Kingdom Patent Application No. GB 1022022.6, mailed on Mar. 21, 2012, 2 pages.

(Continued)

Primary Examiner — Gregory Huson
Assistant Examiner — Eric Gorman
(74) Attorney, Agent, or Firm — International IP Law Group, P.L.L.C.

(57) ABSTRACT

Micro porous absorber structures that be tuned to attenuate noise at the blade pass frequency (BPF) of a cooling fan. The absorber may comprises a panel covered with micro-porous openings with an air gap under the panel. The size of the air gap may be adjusted dynamically to optimize noise attenuation for a fan operating at different speeds.

16 Claims, 4 Drawing Sheets

(56) References Cited

U.S. PATENT DOCUMENTS

| | | | |
|---|---|---|---|
| 7,131,599 B2 * | 11/2006 | Katase | 239/102.1 |
| 7,164,582 B2 * | 1/2007 | Hegde | 361/697 |
| 7,170,746 B2 * | 1/2007 | Watanabe et al. | 361/697 |
| 7,548,422 B2 * | 6/2009 | Hsieh | 361/695 |
| 7,623,348 B2 * | 11/2009 | Otsuki et al. | 361/697 |
| 7,840,020 B1 * | 11/2010 | Miller et al. | 381/326 |
| 8,177,022 B2 * | 5/2012 | Honji | 181/175 |
| 2002/0015640 A1 * | 2/2002 | Nishiyama et al. | 415/119 |
| 2003/0086223 A1 * | 5/2003 | Skinner et al. | 361/71 |
| 2003/0210981 A1 * | 11/2003 | Kim | 415/182.1 |
| 2006/0131103 A1 * | 6/2006 | Fuller et al. | 181/290 |
| 2006/0225952 A1 * | 10/2006 | Takayasu et al. | 181/294 |
| 2007/0144829 A1 * | 6/2007 | Ishikawa et al. | 181/286 |
| 2007/0178827 A1 * | 8/2007 | Erni | 454/353 |
| 2008/0117596 A1 * | 5/2008 | Watanabe et al. | 361/697 |
| 2008/0156461 A1 * | 7/2008 | Otsuki et al. | 165/80.3 |
| 2008/0162388 A1 * | 7/2008 | de la Guardia et al. | 706/14 |
| 2008/0180911 A1 * | 7/2008 | Kaneko et al. | 361/695 |
| 2009/0002549 A1 * | 1/2009 | Kobayashi | 348/374 |
| 2009/0002939 A1 * | 1/2009 | Baugh et al. | 361/687 |
| 2010/0189547 A1 * | 7/2010 | Shirahama et al. | 415/119 |
| 2011/0030923 A1 * | 2/2011 | Liang et al. | 165/104.26 |
| 2014/0271134 A1 * | 9/2014 | Le Roy et al. | 415/119 |
| 2015/0023782 A1 * | 1/2015 | Velzy et al. | 415/119 |

FOREIGN PATENT DOCUMENTS

| | | |
|---|---|---|
| JP | 03074600 A | 8/1989 |
| JP | 04041996 A | 6/1990 |
| JP | 02-227599 A | 9/1990 |
| JP | 03-121298 A | 5/1991 |
| JP | 05-248397 A | 9/1993 |
| JP | 2003-074600 A | 3/2003 |
| JP | 2004-041996 A | 2/2004 |
| TW | 200849510 A | 12/2008 |

OTHER PUBLICATIONS

Office Action received for United Kingdom Patent Application No. GB1022022.6, mailed on Apr. 18, 2011, 6 pages.

Office Action Received for Taiwan Patent Application No. 099143961, mailed on Jan. 24, 2014, 12 Pages of Office Action and 7 pages of English Translation.

Office Action received for German Patent Application No. 102010063918.4, mailed on Dec. 21, 2013, 6 pages of Office Action only.

Office Action received for Chinese Patent Application No. 201010625141.4, mailed on Jul. 1, 2013, 6 pages of Office Action and 8 page of English Translation.

Office Action received for Chinese Patent Application No. 201010625141.4, mailed on May 27, 2014, 4 Pages of Office Action and 6 Pages of English Translation.

* cited by examiner

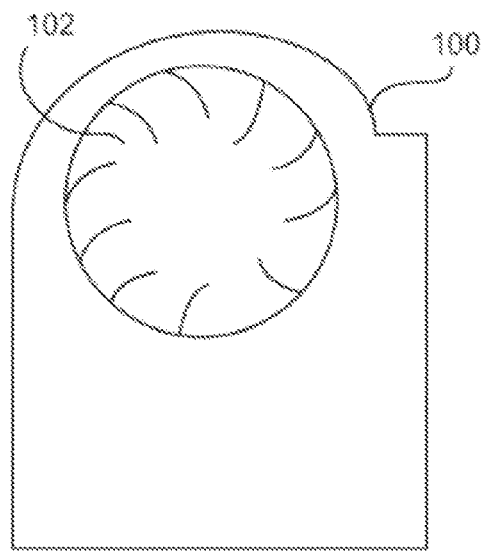
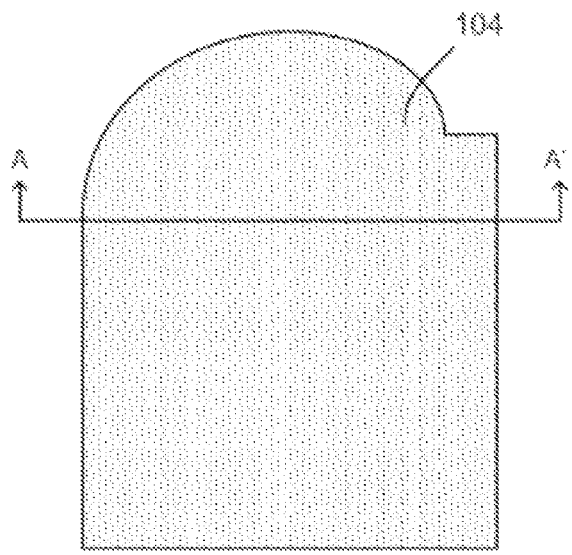
Fig. 1A
Fig. 1B
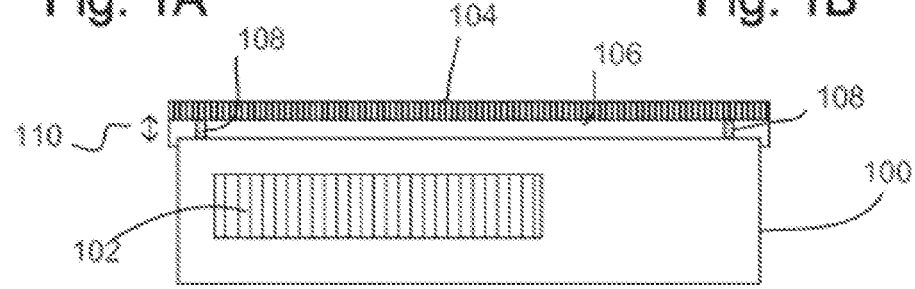
Fig. 1C
| Ref # | Description |
|---|---|
| 100 | Blower Housing |
| 102 | Fan |
| 104 | Micro-Porous Blower Cover |
| 106 | Thin Air Layer |
| 108 | Actuator |
| 110 | Arrow |
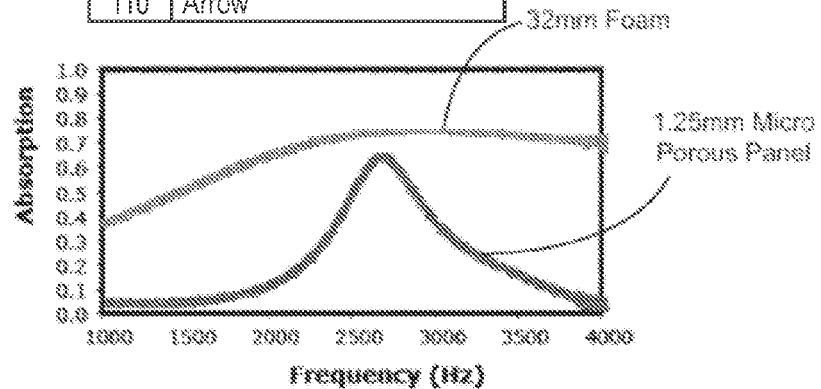
Fig. 2

QUIET SYSTEM COOLING USING COUPLED OPTIMIZATION BETWEEN INTEGRATED MICRO POROUS ABSORBERS AND ROTORS

FIELD OF THE INVENTION

Embodiments of the present invention are directed to quieter cooling systems and, more particularly, to sound absorption for fan cooling of computing devices and the like.

BACKGROUND INFORMATION

Electronic components tend generate unwanted heat during use which should be channeled away from the device for proper operation. Heat sinks are often employed to radiate heat away from the device. Fans are also often used to more efficiently move heat away from the device to keep it cool and operating at a suitable temperature.

The trend to ultra thin notebooks and high density blade servers may make it more difficult to provide sufficient cooling with conventional airflow cooling, due to the space constraints. Smaller fans may thus be used running at higher speeds to move more air; however, this tends to create more acoustic noise.

Low acoustic noise may be important given end user preferences, eco labels, and emerging governmental procurement directives. The use of acoustic absorbers may allow for an increased airflow at the same noise level, but there is no room in the ultra thin systems for traditional, bulky acoustic absorbers such as foams.

Absorbing materials such as foams may be applied, but they are too bulky and do not fit in ultra thin form factors. In addition, the open cell foams lead to airflow loss in the system. Finally, these materials are relatively expensive and hard to integrate. Therefore, acoustic absorbers are usually not used in most electronic devices. Radial blowers and cross flow blowers are available, but they are not optimized and do not contain an integrated noise control solutions.

BRIEF DESCRIPTION OF THE DRAWINGS

The foregoing and a better understanding of the present invention may become apparent from the following detailed description of arrangements and example embodiments and the claims when read in connection with the accompanying drawings, all forming a part of the disclosure of this invention. While the foregoing and following written and illustrated disclosure focuses on disclosing arrangements and example embodiments of the invention, it should be clearly understood that the same is by way of illustration and example only and the invention is not limited thereto.

FIG. 1A is a block diagram of an illustrative blower which may be used, for example, to cool a thin form factor computing device;

FIG. 1B is a block diagram of the blower having a top cover comprising the micro-porous panel according to one embodiment of the invention;

FIG. 1C is a cross sectional view of the blower taken along line A-A' of FIG. 1B FIG. 2 is a graph comparing sound absorption characteristics of a 32 mm foam absorber verses a 1.25 mm micro-porpus panel according on one embodiment;

DETAILED DESCRIPTION

Figure 3:
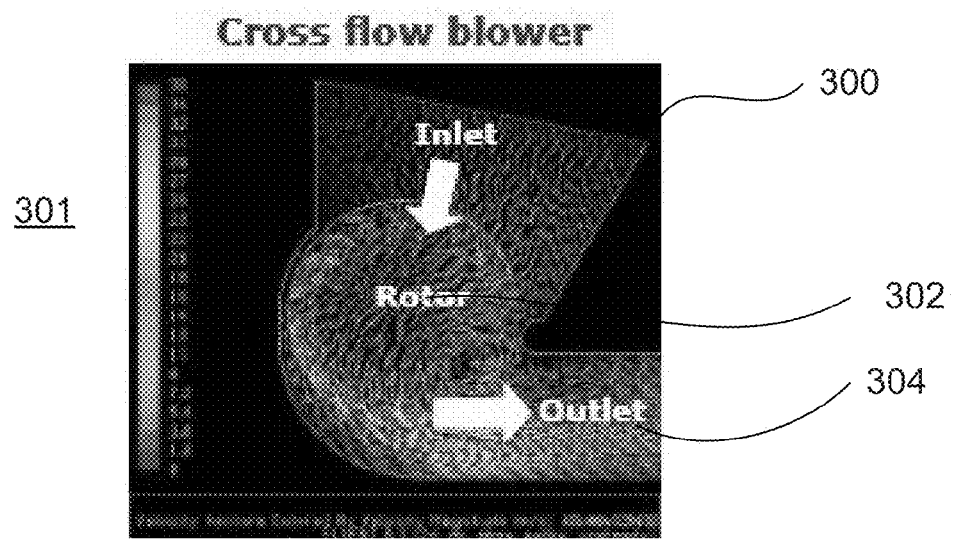
FIG. 3 is a diagram showing airflow through a cross flow blower.

Described are integrated micro porous absorber structures that may be tuned to attenuate noise at the blade pass frequency (BPF) of a cooling fan. Thus, the absorber may be 25 times thinner than a regular foam type absorber. Using this approach, a 1.25 mm thin absorber was designed and integrated that absorbs more than 65% of the sound energy. A regular foam absorber would have to be 32 mm thick in order to achieve this level of absorption. The extremely thin design of the micro porous absorber allows delivering about 10% more cooling and a 6 dB noise reduction, or 25% more airflow at the same acoustic noise level. This enables to meet the upcoming stringent acoustic noise directives, and a 15 to 25% increase in (turbo mode/system) power for ultra thin notebook and blade server platforms.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Referring now to FIG. 1A, there is shown a blower which may be used for example to cool a thin form factor computing device. The blower may comprise a blower housing 100 and a fan 102. This is of course a not-to-scale simplified diagram as a fan motor, vents, heat pipes, and any other items commonly found in blowers may also be present, though not shown. According to one embodiment of the invention, as shown in FIG. 1B, a micro porous structure may be used to reduce noise associated with the blower. In this example, a micro-porous panel 104 replaces the traditional blower cover. The micro-porous panel 104 may be made out of, for example, perforated sheet metal, plastic or film, backed by an air layer. The material comprises a plurality of holes or perforations which may range in sizes and density.

FIG. 1C shows a cross-sectional view taken along line A-A' from FIG. 1B showing the blower housing 100, the fan 102 and the micro-porous panel 104. The micro-porous panel 104 may be backed by a thin air gap 106. The size of the air gap 106 may be fixed or changed dynamically by an actuator 108 to tune the acoustic properties of the micro-porous panel 104. For example, one or more actuators 108 may be used to raise and lower the micro-porous panel 104 changing the size of the air gap 106 and thus dynamically adjusting the acoustic properties of the cover for optimization of noise reduction. The actuators may be for example piezoelectric actuators 108 which moves the cover up and down as illustrated by arrow 110.

The micro-porous panel 104 comprises a thin sheet with micro perforations backed by a thin air gap 106 and may be fabricated using standard materials and high volume manufacturing (HVM) processes. The characteristics of the micro-porous panel 104, such as pore diameter, pore density, sheet thickness and air layer thickness determine the absorption behavior. The acoustic absorption curve typically shows a peak in a certain frequency range, and the location and the width of this peak can be controlled with these parameters. This can be done in a passive sense, e.g. a static mechanical design, but more complex solutions are also possible as mentioned above where the air gap 106 is dynamically adjusted to shift the sound absorption in case of large fan speed variations. This allows the absorber solution to be tailored to absorb the noise generated by the fan or other noise sources.

The new micro-porous panel 104 allows ultra thin designs that are more than 25 times thinner than existing foam type solutions. Therefore it can be integrated into blowers, axial fans, notebooks, CE devices, desktops, servers or mobile internet devices. It also does not require new materials, and as opposed to for example open cell foams, does not have a negative impact on the airflow because the pore diameter is so small.

FIG. 2 shows a graph comparing foam absorbers to the micro porous absorber of the present invention. A value of zero means that no energy is absorbed, while a value of 1 means that all energy is absorbed. The graph shows a comparison with an open cell foam material of 32 mm thick. The results show that the micro porous panel absorber has approximately the same absorption, but is only 1.25 mm thick as compared to the 32 mm thick foam. The peak at which the maximum absorption occurs and the width of this peak can be controlled by adjusting the values for the pore diameter, the pore density, the sheet thickness and the air layer thickness. Thus, the micro porous panel absorber allows ultra thin designs that can be integrated into blowers or notebooks.

Referring to FIG. 3, embodiments of the invention also include optimizing fan design to be used in conjunction with the micro porous absorbers. Current and future notebook cooling solutions use a regular radial blower or cross flow blower to deliver airflow to the system. As shown, a radial cross-flow blower 301 has an inlet 300 through the top and/or bottom, and an air outlet on the side. In the center of the blower a blade rotor 302 rotates to draw air in the inlet 300 and push it out of the outlet 304. The cross flow blower 301 uses a side-in side-out concept, which is especially suited for ultra thin form factors where there is very little space for the top or bottom clearances required for a regular blower. Embodiments of the invention disclose an optimized integrated design, comprising an optimized rotor design, coupled with an integrated noise control solution using a micro porous panel absorber.

Figure 4A:
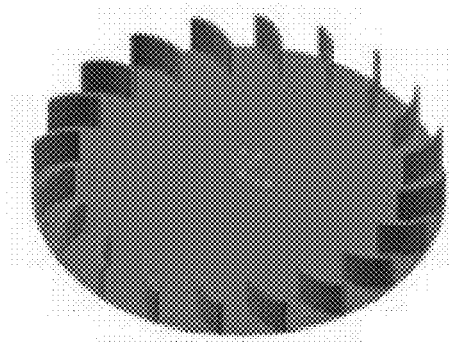
FIGS. 4A and 4B are fan blade rotors having 20 blades and 27 blades, respectively.
Figure 4B:
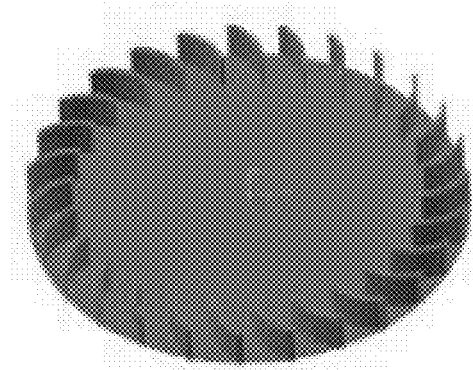
Figure 5:
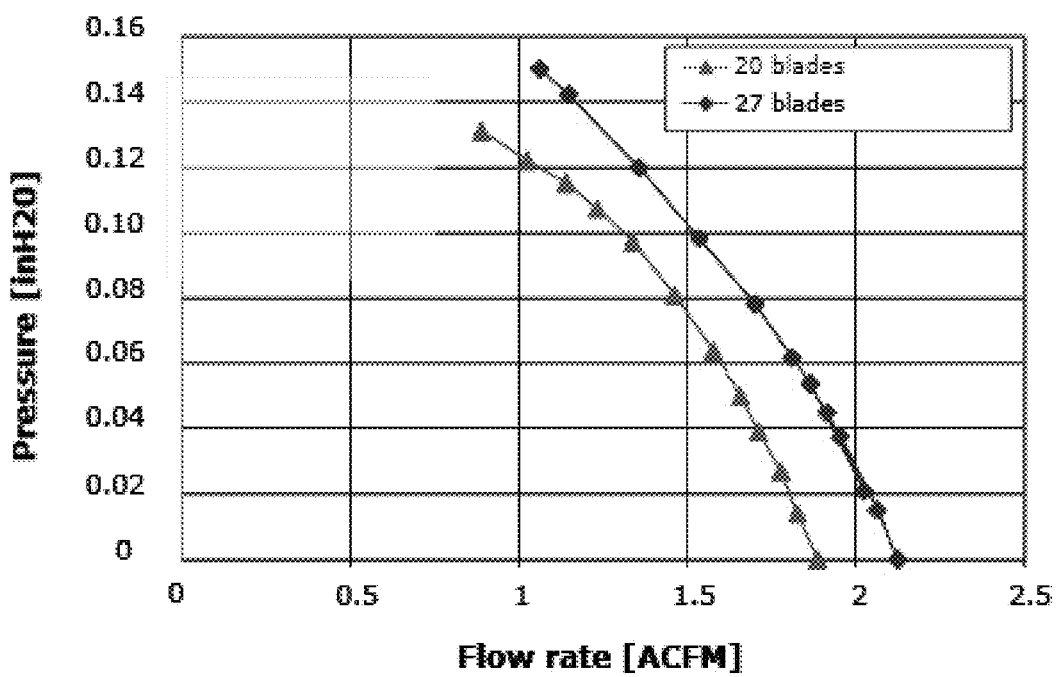
FIG. 5 is a graph showing pressure verses flow rate for a 20 blade rotor and a 27 blade rotor.

Numerical simulations and experiments have shown that an optimal blade number exists for a given rotor. FIG. 4A shows a 20-blade rotor and FIG. 4B shows a 27-blade rotor, as examples. FIG. 5 is a graph showing air pressure verses flow rate for both the 20-blade and 27 blade rotors. The blade pass frequency is determined by the rotational speed of the fan and the number of blades. Optimizing the rotor blade number may lead to an airflow increase of about 10%. The fan rotation will result in an acoustic noise spectrum containing distinct peaks at the blade pass frequency and the higher harmonics. This was experimentally confirmed by comparing a standard 20 blade rotor to a 27 blade rotor for the cross flow blower. The simulations show that the optimal blade number for these types of rotors is approximately 25.

Figure 6:
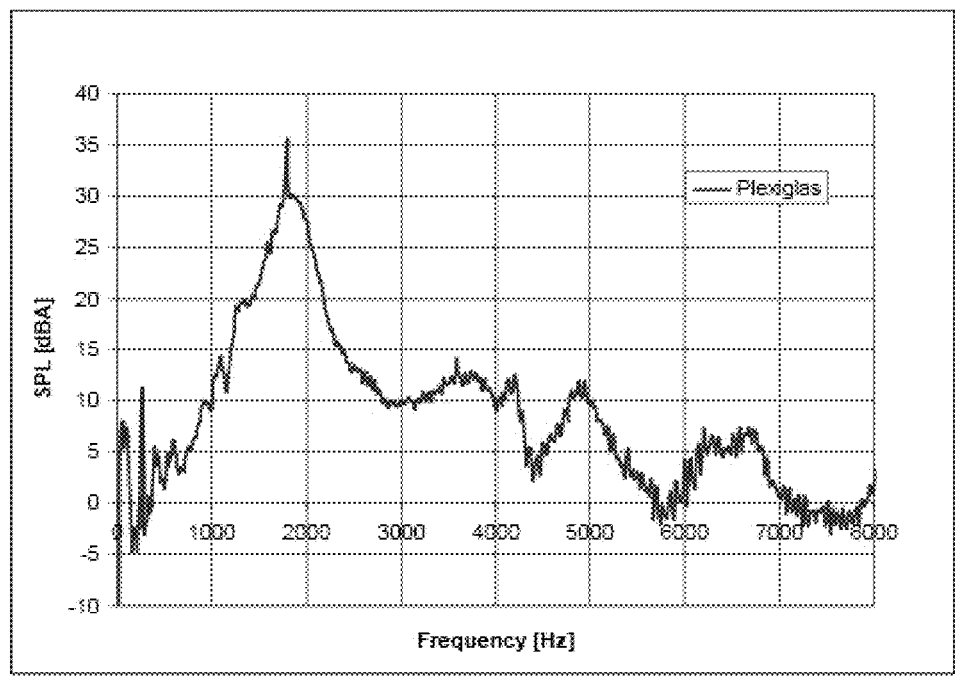
FIG. 6 is a graph illustrating a noise spectrum for a cross-flow blower.

FIG. 6 is a graph illustrating the fan noise spectrum of a cross flow blower. The blade pass frequency at which most noise occurs is determined by the rotational speed of the fan, RPM, and the number of blades, N:

$$f_{BPF}=(RPM*N)/60$$

The micro porous panel absorber design is now designed and integrated to work exactly at the main blade pass frequency.

Figure 7:
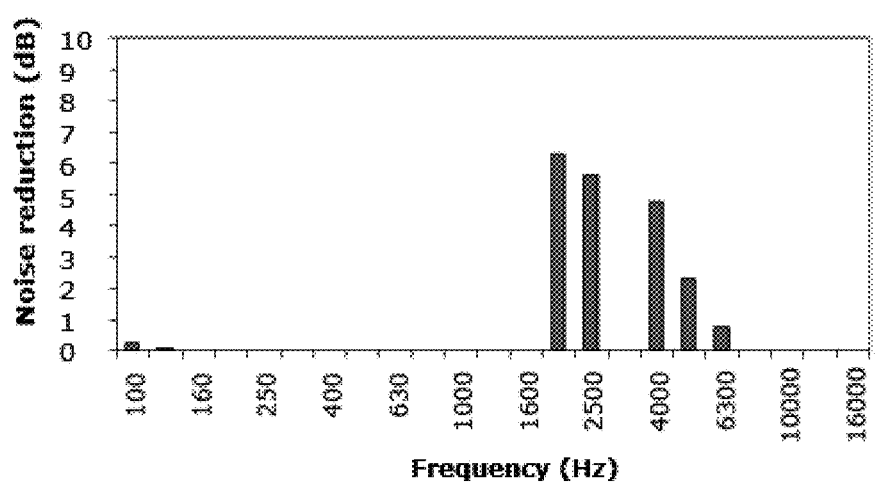
FIG. 7 is a graph showing noise reduction at various frequencies for a blower operating with the micro-porous panel absorber according to one embodiment.

An example of such an integration is shown in FIGS. 1B and 1C discussed above where the top cover of the blower is replaced by a micro perforated panel, backed by an air layer. The noise reduction performance of this sample was measured experimentally. The results are given in FIG. 7 which shows various noise reductions at different frequencies. The graph shows that there is very significant absorption of up to 6 dB in the ⅓ octave bands for which the absorber was designed. Interestingly, it also provides significant noise reduction at the second harmonic of this frequency. The absorber could also be integrated into the side walls of the blower or system to allow the thinnest system possible.

The application of the integrated and tuned micro porous absorbers is not limited to cooling fans. Other applications involve integration into chassis, casing or enclosure designs, heat exchanger designs using perforated fins with the separating air layers as micro porous absorbers. Also, an active concept may be used where the air layer thickness is adjusted automatically using an actuator mechanism. The rotor speed and the acoustic noise levels can be sensed and made available to the system to allow such an active absorber design.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
a blower housing,
a cooling fan in the blower housing;
a micro-porous panel covering at least part of the blower housing, the micro-porous panel to adsorb noise generated by the blower housing;
an air gap between the blower housing and the micro-porous panel; and
an actuator to dynamically adjust acoustic properties of the micro-porous panel by raising or lowering the micro-porous panel in a horizontal plane above the blower housing to change the size of the air gap between the blower housing and the micro-porous panel.

2. The apparatus as recited in claim 1 wherein the cooling fan further comprises:
a plurality of blades having a band pass frequency associated therewith; and
wherein the micro-porous panel characteristics are chosen based on the band pass frequency.

3. The apparatus as recited in claim 2 wherein the micro-porous panel characteristics comprise thickness of the micro-porous panel, pore diameter, pore density, and air gap size.

4. The apparatus as recited in claim 1 wherein the actuator comprises a piezoelectric actuator.

5. The apparatus as recited in claim 2 wherein the plurality of blades comprises between 20 and 27 blades.

6. The apparatus as recited in claim 2 wherein the plurality of blades comprises 25 blades.

7. The apparatus as recited in claim 1 wherein the micro-porous panel comprises a top cover for the blower housing.

8. A method of manufacturing a cooling system, comprising:
disposing a cooling fan within a blower housing;
disposing a micro-porous panel over at least part of the blower housing to adsorb noise generated by the blower housing;
forming an air gap between the micro-porous panel and the blower housing; and
coupling an actuator to the micro-porous panel, wherein the actuator is to dynamically adjust acoustic properties of the micro-porous panel by raising or lowering the micro-porous panel in a horizontal plane above the blower housing to change the size of the air gap between the micro-porous panel and the blower housing and to maximize sound attenuation as the fan operates at different speeds.

9. The method as recited in claim 8 wherein the actuator comprises a piezoelectric actuator.

10. The method as recited in claim 8, further comprising:
determining a number of blades for the cooling fan and an associated band-pass frequency; and
selecting micro-porous panel characteristics based on the band pass frequency.

11. The method as recited in claim 10 wherein the number of blades is 25.

12. The method as recited in claim 10 wherein the micro-porous panel characteristics comprise thickness of the micro-porous panel, pore diameter, pore density, and air gap size.

13. A system for cooling a thin form factor computing device, comprising:
a blower comprising a blower housing in the computing device,
a cooling fan in the blower housing;
a micro-porous panel covering at least part of the blower housing, wherein the micro-porous panel adsorbs noise generated by the blower housing;
an air gap beneath the micro-porous panel; and
an actuator to dynamically adjust acoustic properties of the micro-porous panel by raising or lowering the micro-porous panel in a horizontal plane above the blower housing to change the size of the air gap beneath the micro-porous panel.

14. The system as recited in claim 13 wherein the cooling fan further comprises:
a plurality of blades having a band pass frequency associated therewith; and
wherein the micro-porous panel characteristics are chosen based on the band pass frequency.

15. The system as recited in claim 13 wherein the actuator comprises a piezoelectric actuator.

16. The system as recited in claim 13 wherein the micro-porous panel comprises a top cover for the blower housing.

* * * * *